US012112684B2

(12) United States Patent
Zhou et al.

(10) Patent No.: US 12,112,684 B2
(45) Date of Patent: Oct. 8, 2024

(54) GAMMA VOLTAGE GENERATOR, DISPLAY DEVICE, AND DRIVING METHOD OF DISPLAY PANEL

(71) Applicant: HKC CORPORATION LIMITED, Shenzhen (CN)

(72) Inventors: Mancheng Zhou, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/217,613

(22) Filed: Jul. 3, 2023

(65) Prior Publication Data

US 2024/0282239 A1 Aug. 22, 2024

(30) Foreign Application Priority Data

Feb. 21, 2023 (CN) ......................... 202310142014.6

(51) Int. Cl.
*G09G 3/36* (2006.01)
*G09G 3/20* (2006.01)
(Continued)

(52) U.S. Cl.
CPC ......... *G09G 3/2096* (2013.01); *G09G 3/3225* (2013.01); *G09G 2300/0819* (2013.01);
(Continued)

(58) Field of Classification Search
CPC ............... G09G 3/2096; G09G 3/3225; G09G 2300/0819; G09G 2300/0842;
(Continued)

(56) References Cited

U.S. PATENT DOCUMENTS

2005/0128113 A1 6/2005 Kyung-Myun
2015/0206496 A1* 7/2015 Bae ...................... H04N 13/398 345/82

(Continued)

FOREIGN PATENT DOCUMENTS

CN 103871357 A 6/2014
CN 104464678 A 3/2015

(Continued)

OTHER PUBLICATIONS

International Search Report, International Application No. PCT/CN2023/103344, mailed Oct. 25, 2023 (18 pages).

(Continued)

*Primary Examiner* — Md Saiful A Siddiqui

(57) ABSTRACT

A gamma voltage generator, a display device, and a driving method of a display panel. The gamma voltage generator includes a control module, a data storage module, a digital-to-analog conversion module, and an output module which are electrically connected in sequence. The data storage module includes at least a first data memory and a second data memory. The first memory is configured to store and output a first digital signal to enable the output module to output a first gamma voltage in a first operating phase of the display panel. The second memory is configured to store and output a second digital signal to enable the output module to output a second gamma voltage in a second operating phase of the display panel. The first operating phase and a second operating phase are divided in accordance with a chronological order.

18 Claims, 4 Drawing Sheets

(51) Int. Cl.
*G09G 3/3225* (2016.01)
*G09G 3/3258* (2016.01)

(52) U.S. Cl.
CPC ............... *G09G 2300/0842* (2013.01); *G09G 2320/045* (2013.01); *G09G 2320/0626* (2013.01); *G09G 2320/0666* (2013.01); *G09G 2320/0673* (2013.01)

(58) Field of Classification Search
CPC ..... G09G 2320/045; G09G 2320/0626; G09G 2320/0666; G09G 2320/0673
See application file for complete search history.

(56) References Cited

U.S. PATENT DOCUMENTS

| | | | | |
|---|---|---|---|---|
| 2016/0267842 | A1* | 9/2016 | Zhang | G09G 3/3233 |
| 2018/0130394 | A1 | 5/2018 | Hwang | |
| 2018/0151155 | A1* | 5/2018 | Chen | G06F 3/1438 |
| 2018/0247577 | A1* | 8/2018 | Han | G09G 3/30 |
| 2022/0343845 | A1* | 10/2022 | Wu | G09G 3/035 |

FOREIGN PATENT DOCUMENTS

| | | | |
|---|---|---|---|
| CN | 106023930 | A | 10/2016 |
| CN | 106097961 | A | 11/2016 |
| CN | 106531066 | A | 3/2017 |
| CN | 108962135 | A | 12/2018 |
| CN | 108962140 | A | 12/2018 |
| CN | 110223647 | A | 9/2019 |
| CN | 110767187 | A | 2/2020 |
| CN | 113948024 | A | 1/2022 |
| CN | 115035857 | A | 9/2022 |
| CN | 115938306 | A | 4/2023 |

OTHER PUBLICATIONS

Chinese First Office Action, Chinese Application No. 202310142014.6, mailed Apr. 11, 2023 (21 pages).
Chinese second Office Action, Chinese Application No. 202310142014.6, mailed May 8, 2023 (18 pages).

* cited by examiner

GAMMA VOLTAGE GENERATOR, DISPLAY DEVICE, AND DRIVING METHOD OF DISPLAY PANEL

CROSS REFERENCE

The present application claims priority of Chinese Patent Application No. 202310142014.6, filed on Feb. 21, 2023, the entire content of which is hereby incorporated by reference in its entirety.

TECHNICAL FIELD

The present disclosure relates to the field of display technologies, and in particular to a gamma voltage generator, a display device, and a driving method of a display panel.

BACKGROUND

Organic Light Emitting Diode (OLED) display panels are widely employed in the field of the display technologies duo to multiple advantages thereof, such as low power consumptions, rapid response speeds, wide viewing angles, wide temperature characteristics, light weights, abilities to achieve soft screens, or the like.

In the related art, an OLED display panel generally includes a driving circuit layer and a light-emitting layer electrically connected to the driving circuit layer. Thin film transistors (TFT) in the driving circuit layer require currents to pass all the time during the display panel being operating. With an accumulation of utilizing time of the display panel, TFT components may gradually age, which leads to changes in component characteristics. In addition, an OLED device may also gradually age with an increase of the utilizing time of the display panel. The aging of the TFT components and the aging of OLED devices described above in the display panel may worsen a display effect of the display panel and reduce a service life thereof.

SUMMARY OF THE DISCLOSURE

A gamma voltage generator, a display device, and a driving method of a display panel are provided in the present disclosure, and are intended to solve a problem that the display effect of the display panel gets worse and the service life of the display panel is reduced due to the TFT components and the OLED device aging.

In order to solve the above problem, a first technical solution provided in the present disclosure is to provide a gamma voltage generator. The gamma voltage generator is configured to supply a gamma voltage to a display panel, wherein the gamma voltage generator includes a control circuit; a data storage circuit, electrically connected to the control circuit to receive a control signal of the control circuit and output a corresponding digital signal; a digital-to-analog conversion circuit, electrically connected to the data storage circuit to receive the corresponding digital signal and convert the corresponding digital signal to an analog voltage signal; and an output circuit, electrically connected to the digital-to-analog conversion circuit to receive the analog voltage signal and output a corresponding gamma voltage; wherein the data storage circuit includes at least a first data memory and a second data memory, the first data memory includes a first input terminal and a first output terminal, the first input terminal is electrically connected to the control circuit, the first output terminal is electrically connected to the digital-to-analog conversion circuit, and the first data memory is configured to store and output a first digital signal to enable the output circuit to output a first gamma voltage; the second data memory includes a second input terminal and a second output terminal, the second input terminal is electrically connected to the control circuit, the second output terminal is electrically connected to the digital-to-analog conversion circuit, and the second data memory is configured to store and output a second digital signal to enable the output circuit to output a second gamma voltage; wherein the display panel has a first operating phase and a second operating phase divided in accordance with a chronological order, the control circuit is configured to control the first data memory to output the first digital signal in the first operating phase and control the second data memory to output the second digital signal in the second operating phase.

In some embodiments, the gamma voltage generator further includes a timer circuit, electrically connected to the control circuit and configured to time in response to the display panel being in a bright screen state and output a timing result to the control circuit; wherein the control circuit receives the timing result to determine a current operating phase of the display panel, and operating phases include the first operating phase and the second operating phase.

In some embodiments, the data storage circuit further includes: a third data memory, configured to store and output a third digital signal to enable the output circuit to output a third gamma voltage, and including a third input terminal and a third output terminal; wherein the third input terminal is electrically connected to the control circuit and the third output terminal is electrically connected to the digital-to-analog conversion circuit; wherein the operating phases further include a third operating phase, the third operating phase is after the second operating phase in accordance with the chronological order, and the control circuit controls the third data memory to output the third digital signal in the third operating phase; or the data storage circuit includes at least three data memories configured to store and output digital signals corresponding to different operating phases to enable the output circuit to output gamma voltages corresponding to different the operating phases, respectively.

In order to solve the above problem, a second technical solution provided in the present disclosure is to provide a driving method of a display panel. The driving method of the display panel is based on a gamma voltage generator and includes providing a sample panel; performing an aging experiment test for the sample panel to acquire the first gamma voltage corresponding to a first time period and the second gamma voltage corresponding to a second time period of the sample panel after being turned on; writing the first gamma voltage and the second gamma voltage to the gamma voltage generator, and the gamma voltage generator is the above gamma voltage generator; and in response to a turning-on operation of the display panel, the gamma voltage generator determining a current operating phase of the display panel and outputting the first gamma voltage or the second gamma voltage corresponding to the current operating phase to the display panel to drive the display panel to display an image.

In some embodiments, an operation of the performing an aging experiment test for the sample panel to acquire the first gamma voltage corresponding to a first time period and the second gamma voltage corresponding to a second time period of the sample panel after being turned on includes: turning on the sample panel to enable the sample panel to be in a bright screen state; debugging the gamma voltage in the first time period after the sample panel is turned on to acquire the first gamma voltage and the first digital signal corresponding to the first gamma voltage while the sample panel reaches a target luminance; and debugging the gamma voltage in the second time period after the sample panel is turned on to acquire the second gamma voltage and the second digital signal corresponding to the second gamma voltage when the sample panel reaches the target luminance.

In some embodiments, an operation of the writing the first gamma voltage and the second gamma voltage to the gamma voltage generator, includes writing the first digital signal to the first data memory; and writing the second digital signal to the second data memory.

In some embodiments, an operation of the performing an aging experiment test for the sample panel further includes debugging the gamma voltage in a third time period after the sample panel is turned on to enable the sample panel to reach a target luminance, to acquire the third gamma voltage and the third digital signal corresponding to the third gamma voltage; wherein the driving method further includes writing the third digital signal to the third data memory; and in response to the turning-on operation of the display panel, the gamma voltage generator determining the current operating phase of the display panel and outputting the first gamma voltage or the second gamma voltage or the third gamma voltage corresponding to the current operating phase to the display panel to drive the display panel to display the image.

In some embodiments, an operation of the in response to the turning-on operation of the display panel, the gamma voltage generator determining the current operating phase of the display panel and outputting the first gamma voltage or the second gamma voltage or the third gamma voltage corresponding to the current operating phase to the display panel to drive the display panel to display the image, includes the control circuit receiving the timing result outputted by the timer circuit; the control circuit determining the current operating phase of the display panel based on the timing result, the operating phases further including a third operating phase, wherein the first operating phase, the second operating phase, and the third operating phase corresponds to the first time period, the second time period, and the third time period, respectively; in response to the display panel being in the first operating phase, the control circuit controlling the first data memory to output the first digital signal to enable the output circuit to output the first gamma voltage; in response to the display panel being in the second operating phase, the control circuit controlling the second data memory to output the second digital signal to enable the output circuit to output the second gamma voltage; and in response to the display panel being in the third operating phase, the control circuit controlling a third data memory to output a third digital signal to enable the output circuit to output the third gamma voltage.

In some embodiments, the driving method further includes the timer circuit performing a timing operation in response to the display panel being in the bright screen state; the timer circuit stopping the timing operation in response to the display panel being in a non-bright screen state; and outputting the timing result to the control circuit with a predetermined period.

In some embodiments, an operating time period of the sample panel is divided into the first time period, the second time period, and the third time period in sequence in accordance with the chronological order.

In some embodiments, the operating time period of the sample panel is divided by time nodes, the time nodes are determined based on a debugging parameter of the gamma voltage under a case in which both a display luminance and a color gamut of the sample panel are kept unchanged, and the debugging parameter includes debugging times or a value of a debugged gamma voltage each time.

In some embodiments, the sample panel has the same structure and functions with the display panel.

In some embodiments, the gamma voltage is debugged with a preset period to enable the sample panel to reach the target luminance.

In order to solve the above problem, a third technical solution provided in the present disclosure is to provide a display device. The display device includes a display panel, configured to display an image; and a gamma voltage generator, electrically connected to the display panel and configured to supply a gamma voltage to the display panel to drive the display panel to display the image; wherein the gamma voltage generator is the above gamma voltage generator.

Beneficial effects of the present disclosure are as follows. Different from the related art, the present disclosure provides a gamma voltage generator, a display device, and a driving method of a display panel. The gamma voltage generator includes a control module, a data storage module, a digital-to-analog conversion module, and an output module which are electrically connected in sequence. The data storage module is configured to receive a control signal of the control module and output a corresponding digital signal to the digital-to-analog conversion module, the digital-to-analog conversion module is configured to convert the corresponding digital signal to an analog voltage signal, and the output module receives the analog voltage signal and outputs a corresponding gamma voltage. In the embodiments of the present disclosure, the data storage module includes at least a first data memory and a second data memory, the first memory is configured to store and output a first digital signal, and the second memory is configured to store and output a second digital signal. The display panel has a first operating phase and a second operating phase divided in accordance with a chronological order, the control module is configured to control the first data memory to output the first digital signal in the first operating phase to enable the output module to output a first gamma voltage and control the second data memory to output the second digital signal in the second operating phase to enable the output module to output a second gamma voltage. In this way, the gamma voltage generator may output different gamma voltages in different aging phases of the display panel, to overcome a problem of both the TFT components and the OLED devices gradually aging with the increase of the utilizing time of the display panel. Thereby, an aging phenomenon of the display panel may be improved, and the display effect of the display panel may be prevented from getting worse, such that the service life of the display panel may be increased and a display quality may be improved.

BRIEF DESCRIPTION OF THE DRAWINGS

In order to more clearly illustrate the technical solutions in the embodiments of the present disclosure, the following is a brief description of the drawings required for the description of the embodiments. Apparently, the drawings in the following description are only some embodiments of the present disclosure. Those skilled in the art may acquire other drawings based on these drawings without any creative work.

Figure 1:
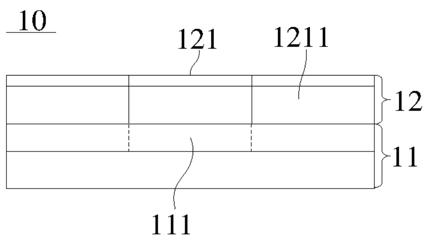
FIG. 1 is a structural schematic view of a display panel according to an embodiment of the present disclosure.

Drawings reference numerals; 10—display panel; 11—driving circuit layer; 111—sub-pixel driving circuit; 12—displaying layer; 121—sub-pixel unit; 1211—light-emitting element; 20—gamma voltage generator; 21—control module; 22—data storage module; 221—first data memory; 222—second data memory; 223—third data memory; 22(*n*)-n$^{th}$ data memory; 23—digital-to-analog conversion module; 24—output module; 25—timer module.

DETAILED DESCRIPTION

The solutions of the embodiments of the present disclosure are described in detail in conjunction with the drawings of the description in the following.

The following description, for a purpose of illustrating not imitating, provides a specific detail such as a particular system structure, interface, technique, or the like, to better understand the present disclosure.

The following will be a clear and complete description of the technical solutions in the embodiments of the present disclosure in conjunction with the accompanying drawings in the embodiments of the present disclosure. Obviously, the described embodiments are only a part of the embodiments of the present disclosure, and not all of them. All other embodiments obtained by a person of ordinary skill in the art based on the embodiments in the present disclosure without creative labor fall within the scope of the present disclosure.

The terms "first", "second", and "third" in the present disclosure are used for descriptive purposes only, and are not to be construed as indicating or implying relative importance or implicitly specifying the number of technical features indicated. Therefore, features defined with the terms "first", "second", and "third" may explicitly or implicitly include at least one of the features. In the description of the present disclosure, a term "plurality" means at least two, such as two, three, etc., unless otherwise expressly and specifically limited. All directional indicators (such as up, down, left, right, front, rear . . . ) in the embodiments of the present disclosure are only used for explaining relative position relationships, movement situations, or the like between components in a specific posture (as shown in the drawings). If the specific posture changes, the directional indicators may change accordingly. In addition, the terms "including" and "having", and any variations thereof, are intended to cover non-exclusive inclusion. For example, a process, method, system, product or apparatus including a series of steps or units is not limited to the listed steps or units, but optionally also includes steps or units that are not listed, or optionally also includes other steps or units that are inherent to those processes, methods, products or apparatus.

"Embodiment" herein means that a particular feature, structure, or characteristic described with reference to embodiments may be included in at least one embodiment of the present disclosure. The term appearing in various places in the specification are not necessarily as shown in the same embodiment, and are not exclusive or alternative embodiments that are mutually exclusive with other embodiments. Those skilled in the art will understand explicitly and implicitly that the embodiments described herein may be combined with other embodiments.

The present disclosure is illustrated in detail in conjunction with the drawings and the embodiments.

As shown in FIG. 1, FIG. 1 is a structural schematic view of a display panel according to an embodiment of the present disclosure. In this embodiment, a display panel 10 is provided and configured to display an image. The display panel 10 includes a drive circuit layer 11 and a displaying layer 12. The driving circuit layer 11 is electrically connected to the displaying layer 12, and the driving circuit layer 11 is configured to drive the displaying layer 12 to display the image. The displaying layer 12 includes a plurality of sub-pixel units 121. Each of the sub-pixel units 121 includes a light-emitting element 1211. In an embodiment, the light-emitting element 1211 may be an OLED device. The driving circuit layer 11 includes a plurality of sub-pixel driving circuits 111. The sub-pixel driving circuits 111 one-to-one correspond to and electrically connected to the sub-pixel units 121 to drive corresponding sub-pixel units 121 to emit light.

Figure 2:
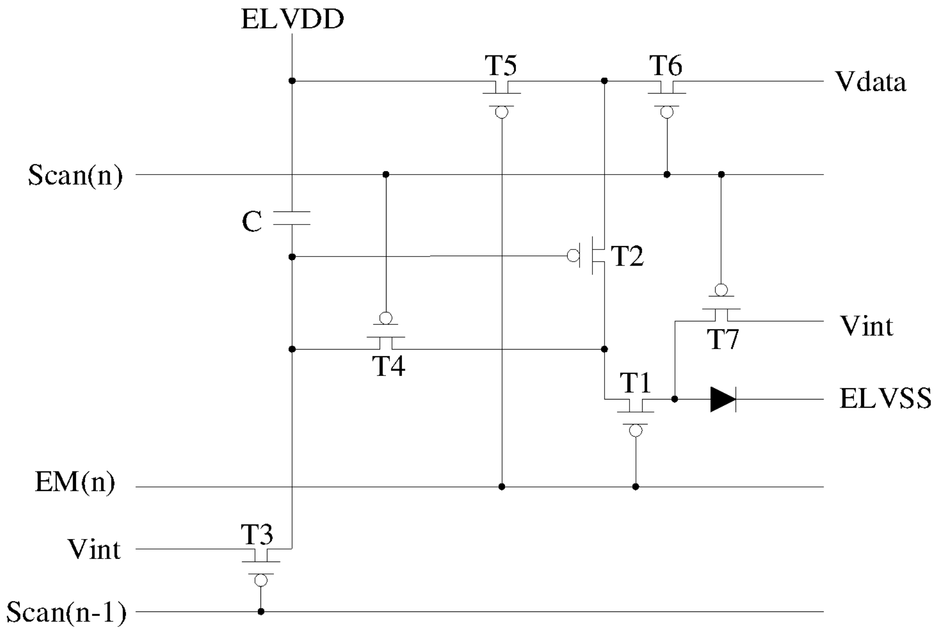
FIG. 2 is a schematic view of a principle of a circuit structure of a pixel driving circuit of a driving circuit layer in FIG. 1 according to an embodiment of the present disclosure.

As shown in FIG. 2, FIG. 2 is a schematic view of a principle of a circuit structure of a sub-pixel driving circuit of the driving circuit layer in FIG. 1 according to an embodiment of the present disclosure. In this embodiment, a pixel driving circuit is provided and includes a first transistor T1, a second transistor T2, a third transistor T3, a fourth transistor T4, a fifth transistor T5, a sixth transistor T6, a seventh transistor T7, a storage capacitor C, and the light-emitting element 1211. The first transistor T1 is configured to control the light-emitting element 1211 to emit light, the second transistor T2 is configured to control a value of a current flowing through the light-emitting element 1211, the third transistor T3 is configured to control a potential on an initialization storage capacitor C, the fourth transistor T4 is configured to compensate for a threshold voltage of the second transistor T2, the fifth transistor T5 is configured to control when a high voltage signal ELVDD supplies power to the light-emitting element 1211, the sixth transistor T6 is configured to control when a data signal Vdata charges the storage capacitor C, and the seventh transistor T7 is configured to initialize the light-emitting element 1211.

In a utilization process of the display panel 10, since transistors T1~T7 requires currents to pass through all the time, with the utilizing time of the display panel 10 increasing, the transistors T1~T7 may gradually age and component output characteristics thereof may vary, especially the second transistor T2. In the sub-pixel driving circuit 111, the second transistor T2 is a device of a voltage controlling a current output. With the utilizing time of the display panel 10 increasing, the device gradually ages, a device characteristic varies, and a control for a current may also be changed accordingly. An outputted characteristic curve may have a drift. Even if the display panel 10 is turned off for a long enough time, these changes may be irrecoverable. In addition, the light-emitting element 1211 may also gradually age with the utilizing time of the display panel 10 increasing. A relationship between a luminous intensity and the current of the light-emitting element 1211 may also be changed. The aging of transistor elements and the aging of the light-emitting element 1211 described above may worsen the display effect of the display panel 10 and reduce the service life of the display panel 10. The inventor of the present disclosure found after researches that the aging of the transistor elements and the aging of the light-emitting element 1211 are fixed within a period, thus the aging phenomenon may be improved by adjusting a value of the data signal Vdata. The data signal Vdata is derived from a gamma voltage γ. Therefore, corresponding different gamma voltages γ may be outputted to the display panel 10 in different operating phases of the display panel 10 to enable both the transistor elements and the light-emitting element 1211 to operate under optimal statuses. Based on the above analysis, a gamma voltage generator 20 is provided in the present disclosure and able to output the corresponding different gamma voltages γ to the display panel 10 in the different operating phases of the display panel 10, such that the aging phenomenon mentioned above may be improved and the display effect of the display panne 10 may be prevented from getting worse. In this way, the service life of the display panel 10 may be further increased and the display quality may be improved. A specific structure and functions of the gamma voltage generator 20 may be referred to a detailed introduction in the following description.

Figure 3:
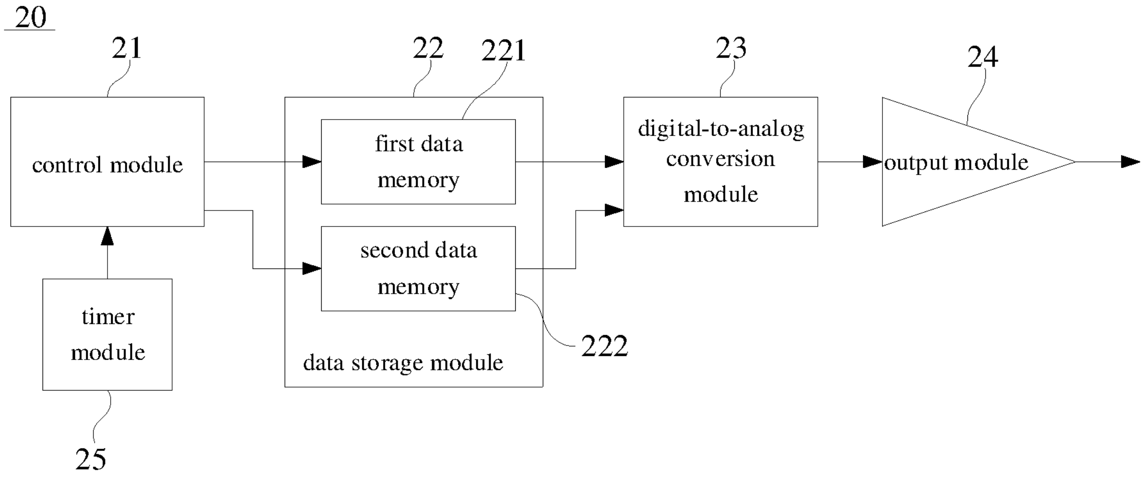
FIG. 3 is a structural schematic view of a gamma voltage generator according to a first embodiment of the present disclosure.

As shown in FIG. 3, FIG. 3 is a structural schematic view of the gamma voltage generator according to a first embodiment of the present disclosure. In this embodiment, the gamma voltage generator 20 is provided and configured to provide the gamma voltage γ to the display panel 10 to enable the display panel 10 to display the image. In an embodiment, the gamma voltage generator 20 includes a control module 21, a data storage module 22, a digital-to-analog conversion module 23, and an output module 24 which are electrically connected in sequence. The control module 21 is configured to output a control signal to the data storage module 22. The data storage module 22 is electrically connected to the control module 21 to receive the control signal from the control module 21 and output a corresponding digital signal. The digital-to-analog conversion module 23 is electrically connected to the data storage module 22 to receive the corresponding digital signal outputted by the data storage module 22 and convert the corresponding digital signal to an analog voltage signal. The output module 24 is electrically connected to the digital-to-analog conversion module 23 to receive the analog voltage signal outputted by the digital-to-analog conversion module 23 and output a corresponding gamma voltage γ.

The data storage module 22 includes at least a first data memory 221 and a second data memory 222. The first data memory 221 includes a first input terminal and a first output terminal. The first input terminal is electrically connected to the control module 21, the first output terminal is electrically connected to the digital-to-analog conversion module 23, and the first data memory 221 is configured to store and output a first digital signal to enable the output module 24 to output a first gamma voltage γ1. The second data memory 222 includes a second input terminal and a second output terminal. The second input terminal is electrically connected to the control module 21, the second output terminal is electrically connected to the digital-to-analog conversion module 23, and the second data memory 222 is configured to store and output a second digital signal to enable the output module 24 to output a second gamma voltage γ2. That is, the first data memory 221 stores and outputs the first digital signal, the first digital signal is converted to the first gamma voltage γ1 after being processed by the digital-to-analog conversion module 23 and the output module 24. The second data memory stores and outputs the second digital signal, and the second digital signal is converted to the second gamma voltage γ2 after being processed by the digital-to-analog conversion module and the output module 24.

The display panel 10 described above has a first operating phase and a second operating phase divided in accordance with a chronological order. The first operating phase is (t0, t1), indicating that a cumulative duration of the display panel 10 serving in a bright screen state is in a range of t0 to t1. The second operating phase is (t1, t2), indicating that the cumulative duration of the display panel 10 serving in the bright screen state is in a range of t1 to t2. The first operating phase and the second operating phase may be divided according to an aging degree of the display panel 10. For example, when the display panel 10 serves in the bright screen state cumulatively up to a time node of x1, the gamma voltage γ required by the display panel 10 is required to be increased or decreased by a fixed value y, may both the display effect and the service life be kept unchanged. That is, t1=x1, the first operating phase is (0, x1), the second operating phase is (x1, xn), and xn is a maximum utilizing time of the display panel 10 in the bright screen state. The fixed value y which the gamma voltage γ is increased or decreased by may be set according to the actual need, such that the time node t1 of the operating phases may be determined to divide the operating phases. Alternatively, when the display panel 10 serves in the bright screen state cumulatively up to a time node of x2, a luminance and/or a color gamut of the display panel 10 are reduced to a specific degree. The time node x2 is taken as a division node of the operating phases. That is, t1=x2, the first operating phase is (0, x2), the second operating phase is (x2, xn). A reducing degree of the luminance and/or the color gamut of the display panel 10 may be set according to the actual need, such that the time node t1 of the operating phases may be determined to divide the operating phases. In the second operating phase, an output voltage of the gamma voltage generator 20 is changed from the first gamma voltage γ1 to the second gamma voltage γ2 to compensate for the luminance and/or the color gamut of the display panel 10. In this way, the display effect and the service life of the display panel 10 may be free from influences of the aging of the transistor components and the aging of the light-emitting element 1211.

The control module 21 is configured to control the first data memory 221 to output the first digital signal in the first operating phase to enable the output module 24 to output the first gamma voltage γ1 and control the second data memory 222 to output the second digital signal in the second operating phase to enable the output module 24 to output the second gamma voltage γ2, so as to overcome the problem of both the transistor components and the light-emitting element 1211 in the display panel 10 gradually aging with the increase of the utilizing time of the display panel 10. In this way, the aging phenomenon of the display panel 10 may be improved and the display effect of the display panel 10 may be prevented from getting worse, such that the service life of the display panel 10 may be increased and the display quality may be improved.

In this embodiment, the gamma voltage generator 20 may further include a timer module 25. The timer module 25 is electrically connected to the control module 21 and configured to time in response to the display panel being in the bright screen state and output the timing result to the control module 21. The control module receives the timing result to determine a current operating phase of the display panel 10. The operating phases include the first operating phase and the second operating phase described above. In some embodiments, when the display panel 10 is turned on and in the bright screen state, the timer module 25 times and periodically outputs the timing result to the control module 21. In an embodiment, a timing manner may be in a cumulative manner. That is, the timer accumulates based on a previous result each time the timer times. Alternatively, the timing manner may also be retiming each time the display panel 10 is illuminated and periodically outputting the timing result to the control module 21. The control module 21 accumulates based on received timing results and calculates a sum of actual utilizing time of the display panel 10, subsequently determines which operating phase the display panel 10 is in based on the sum of the actual utilizing time, and controls a corresponding data memory to output a digital signal. An output period of the timing result of the timer module 25 may be set according to the actual need, which may be, e.g., 5 min, 30 min, 1 h, 5 h, 10 h, etc., and is not limited herein.

In an embodiment, when the display panel 10 is turned on and in the bright screen state, the timer module 25 times and periodically outputs the timing result to the control module 21. The control module 21 determines which operating phase the display panel 10 is currently in based on the timing result. When the display panel 10 is in the first operating phase, the control module 21 controls the first data memory 221 to output the first digital signal. The digital-to-analog converter module 23 receives the first digital signal and converts the first digital signal to a first analog voltage signal. The output module 24 receives the first analog voltage signal and outputs the first gamma voltage $\gamma 1$ after processing. When the display panel 10 is in the second operating phase, the control module 21 controls the second data memory 222 to output the second digital signal. The digital-to-analog conversion module 23 receives the second digital signal and converts the second digital signal to a second analog voltage signal. The output module 24 receives the second analog voltage signal and outputs the second gamma voltage $\gamma 2$ after processing. The output module 24 is configured to receive an analog signal and output the gamma voltage $\gamma$ after processing, such that a driving capability of the gamma voltage $\gamma$ is improved.

In this embodiment, through dividing the operating phases of the display panel 10, the operating phases may be divided into the first operating phase and the second operating phase according to aging degrees of the display panel 10. Further, the gamma voltage generator 20 is configured to output a corresponding first gamma voltage $\gamma 1$ when the display panel 10 is in the first operating phase and to output a corresponding second gamma voltage $\gamma 2$ when the display panel 10 is in the second operating phase, so as to compensate for the aging degree of the display panel 10. In this way, an aging problem of the display panel 10 may be improved and the display effect of the display panel 10 may be prevented from getting worse, such that the service life of the display panel 10 may be increased and the display quality may be improved.

Figure 4:
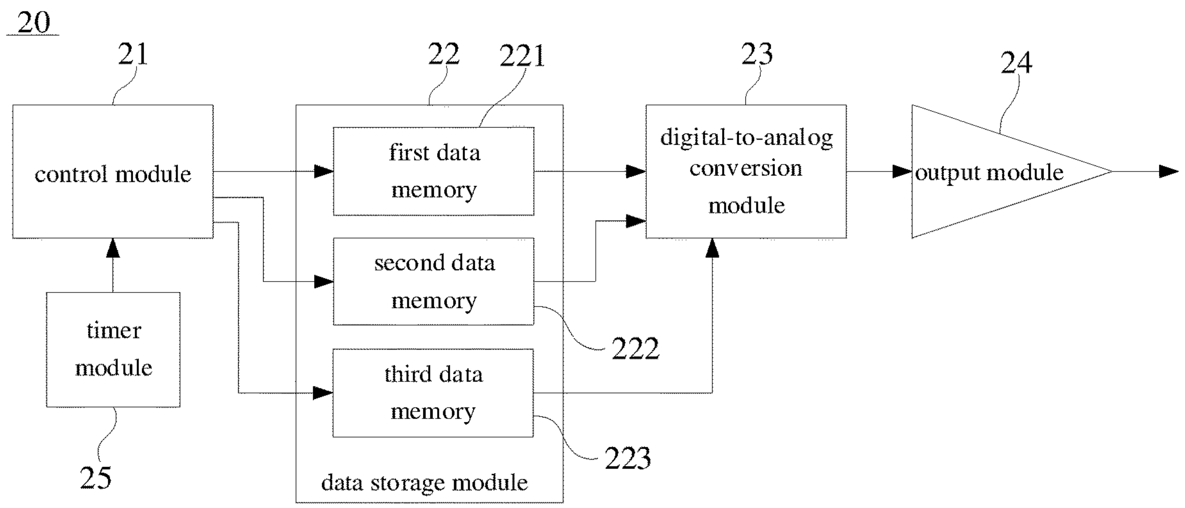
FIG. 4 is a structural schematic view of the gamma voltage generator according to a second embodiment of the present disclosure.

As shown in FIG. 4, FIG. 4 is a structural schematic view of the gamma voltage generator according to a second embodiment of the present disclosure. In this embodiment, the gamma voltage generator 20 is provided. A difference from the first embodiment is, in this embodiment, the data storage module 22 further includes a third data memory 223. The third data memory 223 is configured to store and output a third digital signal to enable the output module to output a third gamma voltage $\gamma 3$. The third data memory 223 includes a third input terminal and a third output terminal. The third input terminal is electrically connected to the control module and the third output terminal is electrically connected to the digital-to-analog conversion module 23. The operating phases further include a third operating phase. The third operating phase is after the second operating phase in accordance with the chronological order. The control module 21 controls the third data memory 223 to output the third digital signal in the third operating phase. Similar to the first operating phase and the second operating phase, the third operating phase is (t2, t3), indicating that the cumulative duration of the display panel 10 serving in the bright screen state is in the range of t2 to t3.

In an embodiment, the first operating phase, the second operating phase, and the third operating phase may be divided according to the aging degrees of the display panel 10. For example, when the display panel 10 serves in the bright screen state cumulatively up to the time node of x1, the gamma voltage $\gamma$ required by the display panel 10 is required to be increased or decreased by the fixed value y for the first time, may both the display effect and the service life be kept unchanged. That is, t1=x1, the first operating phase is (0, x1). When the display panel 10 serves in the bright screen state cumulatively up to the time node of x2, the gamma voltage $\gamma$ required by the display panel 10 is required to be increased or decreased by the fixed value y for the second time, may both the display effect and service life be kept unchanged. That is, t2=x2, and the second operating phase is (x1, x2). When the cumulative duration of the display panel 10 serving in the bright screen state is greater than x2, the gamma voltage $\gamma$ required by the display panel 10 is required to be increased or decreased by the fixed value y for the third time, may both the display effect and the service life be kept unchanged. The third operating phase is (x2, xn), xn is the maximum utilizing time of the display panel 10 in the bright screen state, and xn>x2>x1>0. The fixed value y which the gamma voltage $\gamma$ is increased or decreased by may be set according to the actual need, such that the time node t1 of the operating phases may be determined to divide the operating phases. That is, the service life of display panel 10 in the bright screen state is xn. In this embodiment, the service life of the display panel 10 in the bright screen state is divided into three operating phases (0, x1), (x1, x2), and (x2, xn) according to the aging degrees of the display panel 10. In the three different operating phases, the gamma voltage generator 20 may output the corresponding different gamma voltages $\gamma$, so as to output the gamma voltage $\gamma$ in response to the aging in each aging phase of the display panel 10. In this way, the display effect of the display panel 10 is prevented from getting worse, thereby the service life of the display panel 10 may be increased and the display quality may be improved. In other embodiments, similar to the manner of dividing the operating phases of the display panel 10 in this embodiment, the operating phases of the display panel 10 may also be divided according to the reducing degree of the luminance and/or the color gamut of the display panel 10, which may be referred to a specific division manner in the above embodiments and is not repeated herein.

Figure 5:
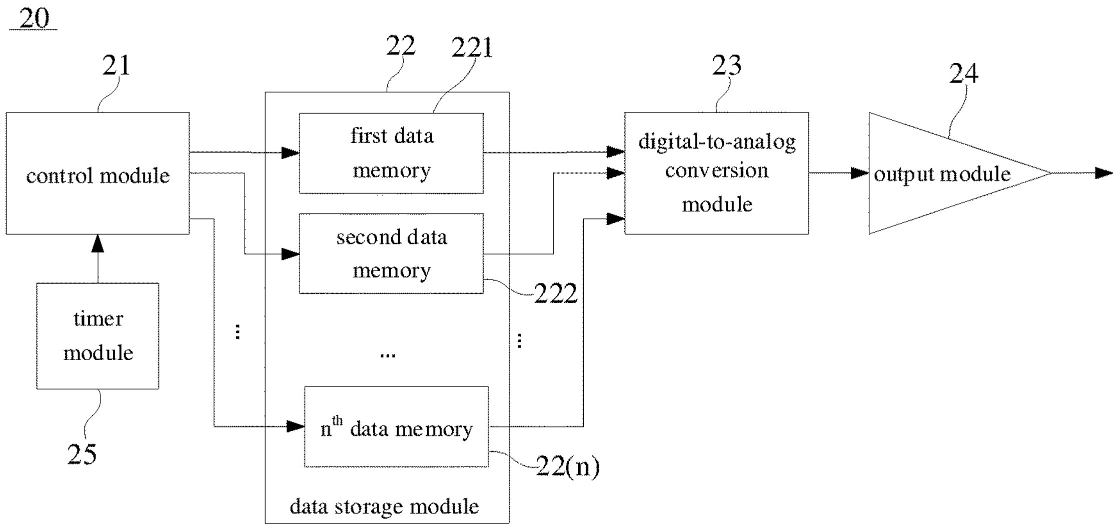
FIG. 5 is a structural schematic view of the gamma voltage generator according to a third embodiment of the present disclosure.

As shown in FIG. 5, FIG. 5 is a structural schematic view of the gamma voltage generator according to a third embodiment of the present disclosure. In this embodiment, the gamma voltage generator 20 is provided, and a difference from the first embodiment and the second embodiment is that the data storage module 22 includes at least three data memories configured to store and output digital signals corresponding to different operating phases to enable the output module 24 to output the gamma voltages γ corresponding to the operating phases, respectively.

In an embodiment, the data storage module 22 may include N data memories, i.e., the first data memory 221, the second data memory 222 . . . , and the $N^{th}$ data memory 22(*n*). The operating phases of the display panel 10 include N operating phases, i.e., the first operating phase, the second operating phase . . . , and the $N^{th}$ operating phase arranged in accordance with the chronological order. A plurality of data memories one-to-one corresponds to a plurality of operating phases, such that the gamma voltage generator 20 may output the first gamma voltage γ1 in the first operating phase, output the second gamma voltage γ2 in the second operating phase, . . . , and output the $N^{th}$ gamma voltage γn in the $N^{th}$ operating phase to match the aging degrees of the display panel 10. In this way, the display effect and the service life of the display panel 10 may be free from the aging of the transistor components and the aging of the light-emitting element 1211. It should be noted that N herein is a positive integer greater than 3.

A specific division manner of the operating phases is the same or similar to the specific division manner of the operating phases involved in the above embodiments, and may achieve the same technical effect, which may be referred to the detailed introduction in the above description and is not repeated herein. In this embodiment, the operating phases of the display panel 10 are divided into more zone segments, and data memories are configured to one-to-one correspond to the operating phases, such that the gamma voltage generator 20 may output a corresponding gamma voltage γ matching the aging degree of the display panel 10 in each operating phase of the display panel 10. Thus, both the display effect and the service life of the display panel 10 may be free from the aging of the transistor components and the aging of the light-emitting element 1211. In addition, in this embodiment, the operating phases of the display panel 10 are divided to more zone segments based on the aging degrees of the display panel 10. Each of the zone segments has a matched data memory. In this way, the gamma voltage γ outputted by the gamma voltage generator 20 may have a higher refined degree, which may be more adaptive to the aging degree of the display panel 10, such that the problem of the display effect getting worse and the service life being reduced due to the aging of the display panel 10 may be further improved.

Figure 6:
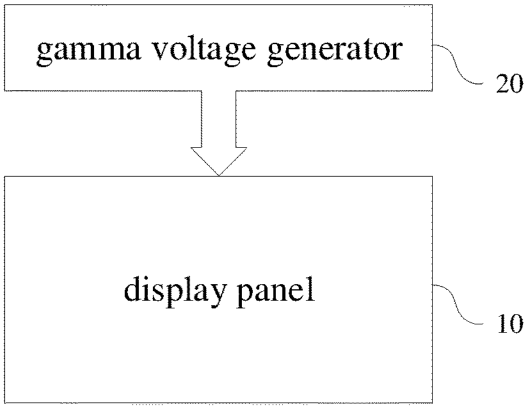
FIG. 6 is a structural schematic view of a display device according to an embodiment of the present disclosure.

As shown in FIG. 6, FIG. 6 is a structural schematic view of a display device according to an embodiment of the present disclosure. In this embodiment, a display device is provided and includes the display panel 10 and the gamma voltage generator 20. The display panel 10 is configured to display the image. A specific structure and functions of the display panel 10 are the same as or similar to the specific structure and functions of the display panel 10 involved in the above embodiments, which may be referred to the detailed introduction in the above description and not repeated herein. The gamma voltage generator 20 is electrically connected to the display panel 10 and is configured to provide the gamma voltage γ to the display panel 10 to drive the display panel 10 to display the image. A specific structure and functions of the gamma voltage generator 20 are the same as or similar to the specific structure and functions of the gamma voltage generator 20 involved in the above embodiments, which may be referred to the detailed introduction in the above description and not repeated herein. A method of the gamma voltage generator 20 driving the display panel 10 is not specifically described herein, which may be referred to the following description.

Figure 7:
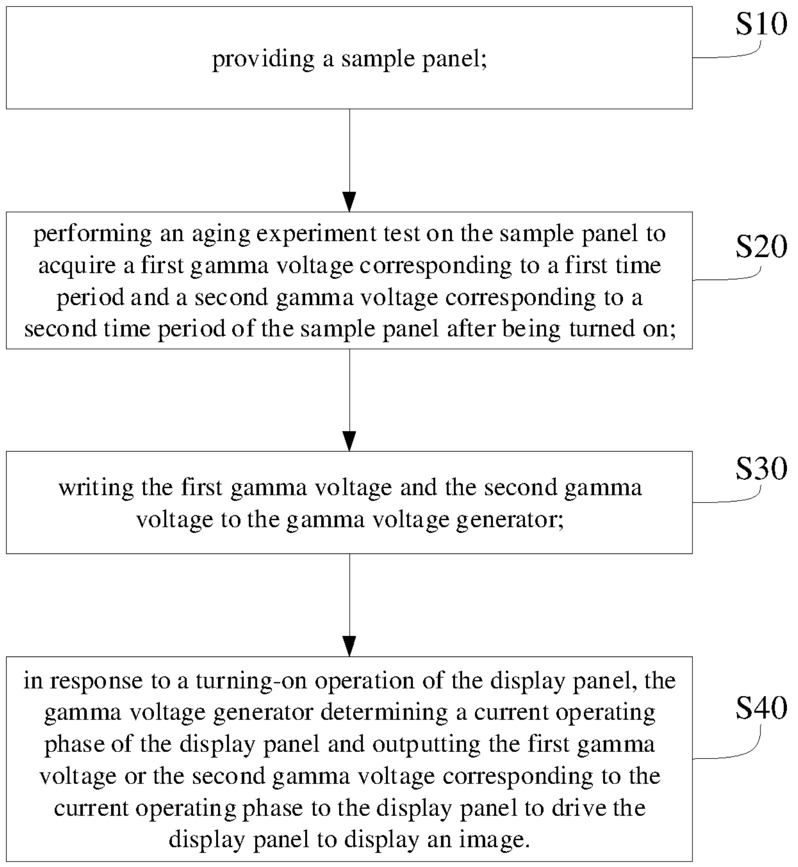
FIG. 7 is a schematic flowchart of a driving method of the display panel according to an embodiment of the present disclosure.

As shown in FIG. 7, FIG. 7 is a schematic flowchart of a driving method of the display panel according to an embodiment of the present disclosure. In this embodiment, the driving method of the display panel 10 is provided. The driving method is based on the gamma voltage generator 20 involved in the above embodiments and includes operations S10-S40.

In an operation S10, the method includes providing a sample panel:

In an operation S20, the method includes performing an aging experiment test for the sample panel to acquire a first gamma voltage γ1 corresponding to a first time period and a second gamma voltage γ2 corresponding to a second time period of the sample panel after being turned on.

In an operation S30, the method includes writing the first gamma voltage γ1 and the second gamma voltage γ2 to the gamma voltage generator.

In an operation S40, the method includes in response to a turning-on operation of the display panel 10, the gamma voltage generator 20 determining a current operating phase of the display panel 10 and outputting the first gamma voltage γ1 or the second gamma voltage γ2 corresponding to the current operating phase to the display panel 10 to drive the display panel 10 to display an image.

In this embodiment, the aging experiment test is first required to be performed for the sample panel to acquire the first gamma voltage γ1 corresponding to the first time period and the second gamma voltage γ2 corresponding to the second time period of the sample panel after being turned on. In a process of performing the aging experiment test, after the sample panel is turned on, the sample panel is kept in the bright screen state all the time to reduce an experiment duration of the aging experiment test. In an embodiment, corresponding to the first embodiment in the above description, a period of the sample panel being in the bright screen state is divided into the first time period and the second time period. A specific time division node may be determined based on measurement data of the aging experiment test, so as to acquire a time node between the first operating phase and the second operating phase of a finished display panel 10. In this embodiment, the sample panel has the same structure and functions with the finished display panel 10, such that experiment data acquired from the aging experiment test matches the display panel 10. In this way, the aging problem of the display panel 10 may be overcome, and an image display effect of the display panel 10 may be improved and the service life of the display panel 10 may be increased.

Figure 8:
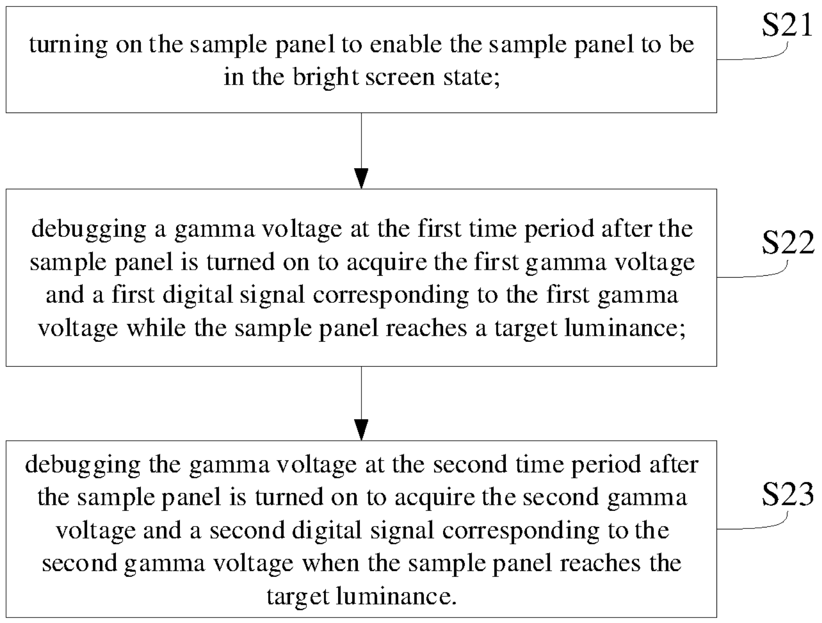
FIG. 8 is a schematic flowchart of an operation S20 in FIG. 7 according to an embodiment of the present disclosure.

As shown in FIG. 8, FIG. 8 is a schematic flowchart of the operation S20 in FIG. 7 according to an embodiment of the present disclosure. In this embodiment, the operation S20 may specifically include operations S21-S23.

In an operation S21, the method may include turning on the sample panel to enable the sample panel to be in the bright screen state.

In an operation S22, the method may include debugging a gamma voltage γ in the first time period after the sample panel is turned on to acquire the first gamma voltage γ1 and a first digital signal corresponding to the first gamma voltage γ1 while the sample panel reaches a target luminance.

In an operation S23, the method may include debugging the gamma voltage γ in the second time period after the sample panel is turned on to acquire the second gamma voltage γ2 and a second digital signal corresponding to the second gamma voltage γ2 when the sample panel reaches the target luminance.

In this embodiment, the gamma voltage γ is debugged once after every preset period under the sample panel being turned on and kept in the bright screen state, such that the sample panel may reach the target luminance and a target color gamut. Alternatively, it may be appreciated to be a case in which both a display luminance and a color gamut of the sample panel are kept unchanged, a time node between the first time period and the second time period is subsequently determined based on a debugging parameter (such as debugging times, a value of a debugged gamma voltage γ each time, or the like) of the gamma voltage γ. For example, before the time node t1, a difference change between debugged gamma voltages γ in corresponding debugging times is within a preset accuracy. After the time node t1, the difference change between the debugged gamma voltages γ in the corresponding debugging times is also within the preset accuracy, while the gamma voltage γ before t1 has a greater difference from the gamma voltage γ after t1. For example, before t1, when the gamma voltage γ is V1, the display luminance and the color gamut of the sample panel may be kept substantially the same with an initial luminance and an initial color gamut. After t1, the gamma voltage γ is required to be adjusted to V2 to keep the display luminance and the color gamut of the sample panel to be substantially the same with the initial luminance and the initial color gamut. That is, t1 is the time node between the first time period and the second time period, the first time period is (0, t1), and the second time period (t1, tn), and tn is an actual service life of the sample panel.

Alternatively, the aging degree of the sample panel may first be predicted based on various performance parameters of the sample panel, and the first time period and the second time period of the sample panel are subsequently divided in accordance with the chronological order. The gamma voltage γ is debugged in each time period, respectively, to enable the display luminance and the color gamut of the sample panel to be substantially the same with the initial luminance and the initial color gamut, such that the first gamma voltage γ1 and the first digital signal corresponding to the first gamma voltage γ1 while the sample panel reaches the target luminance and the target color gamut and the second gamma voltage γ2 and the second digital signal corresponding to the second gamma voltage γ2 while the sample panel reaches the target luminance and the target color gamut may be obtained.

Figure 9:
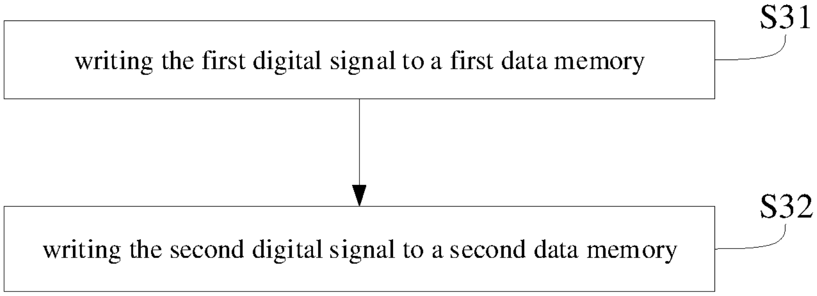
FIG. 9 is a schematic flowchart of an operation S30 in FIG. 7 according to an embodiment of the present disclosure.

As shown in FIG. 9, FIG. 9 is a schematic flowchart of the operation S30 in FIG. 7 according to an embodiment of the present disclosure. In this embodiment, the operation S30 may include the following operations S31-S32.

In an operation S31, the method may include writing the first digital signal to a first data memory.

In an operation S32, the method may include writing the second digital signal to a second data memory.

In this embodiment, the first digital signal and the second digital signal obtained through the aging experiment test performed for the sample panel are written to the first data storage memory 221 and the second data storage memory 222, respectively, such that the gamma voltage generator 20 may output different gamma voltages γ in different time to match the aging degrees of the display panel 10 at different operating phases. In this way, the problem of the display effect getting worse and the service life being reduced due to the display panel 10 aging gradually with the increase of the utilizing time may be overcome.

Further, in the operation S40, the gamma voltage generator 20 is assembled with the display panel 10 to form a display device. In response to the turning-on operation of the display panel 10, the display panel 10 is in the bright screen state, and the gamma voltage generator 20 determines the current operating phase of the display panel 10. When the display panel 10 is currently in the first operating phase, the gamma voltage generator 20 outputs the first gamma voltage γ1 corresponding to the first operating phase to the display panel 10. When the display panel 10 is currently in the second operating phase, the gamma voltage generator 20 outputs the second gamma voltage γ2 corresponding to the second operating phase to the display panel 10. In this way, the display panel 10 is driven to display the image. The first operating phase of the display panel 10 corresponds to the first time period of the sample panel, and the second operating phase of the display panel 10 corresponds to the second time period of the sample panel. It should be noted that a duration of the display panel 10 being in a non-bright screen state is not counted into the first operating phase and the second operating phase, and durations of the first operating phase and the second operating phase only include a duration of the display panel 10 being in the bright screen state, and does not include a duration of an off screen state, such that the gamma voltage generator 20 is free from a screen-off period when the gamma voltage generator 20 outputs the gamma voltage γ to the display panel 10.

Figure 10:
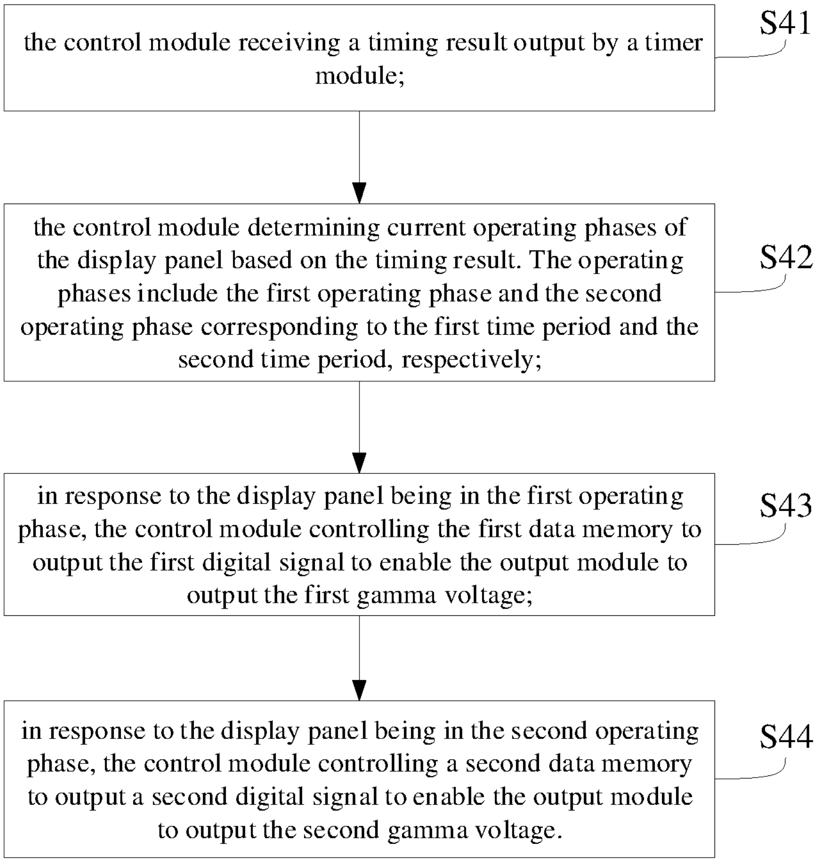
FIG. 10 is a schematic flowchart of an operation S40 in FIG. 7 according to an embodiment of the present disclosure.

As shown in FIG. 10, FIG. 10 is a schematic flowchart of the operation S40 in FIG. 7 according to an embodiment of the present disclosure. In this embodiment, the operation S40 may specifically include the following operations S41-S44.

In an operation S41, the method may include the control module 21 receiving a timing result outputted by a timer module 25.

In an operation S42, the method may include the control module 21 determining the current operating phase of the display panel 10 based on the timing result. The operating phases include the first operating phase and the second operating phase corresponding to the first time period and the second time period, respectively.

In an operation S43, the method may include in response to the display panel being in the first operating phase, the control module 21 controlling the first data memory 221 to output the first digital signal to enable the output module 24 to output the first gamma voltage γ1.

In an operation S44, the method may include in response to the display panel 10 being in the second operating phase, the control module 21 controlling a second data memory 222 to output a second digital signal to enable the output module 24 to output the second gamma voltage γ2.

In this embodiment, in response to the turning-on operation of the display panel 10, when the display panel 10 is in the bright screen state, the timer module 25 performs a timing operation. The timer may periodically output the timing result to the control module 21. Alternatively, in response to the turning-on operation of the display panel 10, the control module 21 transmits the control signal to the timer module 25, and the timer module 25 transmits the timing result to the control module 21. After receiving the timing result, the control module 21 determines the current operating phase of the display panel 10 based on the timing result. When the display panel 10 is in the first operating phase, the control module 21 controls the first data memory 221 to output the first digital signal to enable the output module 24 to output the first gamma voltage γ1. When the display panel 10 is in the second operating phase, the control module 21 controls the second data memory 222 to output the second digital signal to enable the output module 24 to output the second gamma voltage γ2, so as to drive the display panel 10 to display the image. Through the above driving method, the gamma voltage γ outputted by the gamma voltage generator 20 may always be an optimal driving voltage required in the current operating phase of the display panel 10, such that the sample panel may be avoided to occur a phenomenon of the display effect getting worse, such as an uneven display, a reduced luminance, a reduced color gamut, etc., due to gradual aging.

In another embodiment, the operation S20 may include an operation S24.

In the operation S24, the method may include debugging the gamma voltage γ in a third time period after the sample panel is turned on to enable the sample panel to reach the target luminance, to acquire a third gamma voltage γ3 and the third digital signal corresponding to the third gamma voltage γ3. Accordingly, the driving method may further include operations S33 and S45.

In an operation S33, the method may include writing the third digital signal to the third data memory 223.

In an operation S45, the method may include in response to the display panel 10 being in the third operating phase, the control module 21 controlling a third data memory 223 to output the third digital signal to enable the output module 24 to output the third gamma voltage γ3.

In this embodiment, an operating time period of the sample panel is divided into three time periods in accordance with the chronological order. Correspondingly, the operating phases of the display panel 10 include the first operating phase, the second operating phase, and the third operating phase arranged in sequence in accordance with the chronological order. The gamma voltage generator 20 includes three data memories configured to output the first gamma voltage γ1 in the first operating phase, output the second gamma voltage γ2 in the first operating phase, and output the third gamma voltage γ3 in the third operating phase, respectively. In this way, the gamma voltage γ outputted by the gamma voltage generator 20 may always be the optimal driving voltage required in the current operating phase of the display panel 10, such that the display panel 10 may be avoided to occur the phenomenon of the display effect getting worse, such as the uneven display, the reduced luminance, the reduced color gamut, etc., due to gradual aging. Compared with the above embodiment, in this embodiment, the operating time period of the sample panel is divided into three time periods in accordance with the chronological order, and the operating phases of the display panel 10 also include the first operating phase, the second operating phase, and the third operating phase arranged in sequence in accordance with the chronological order. Thus, in this embodiment, the division for the operating phases of the display panel 10 is more refined, and the gamma voltage γ in outputted by the gamma voltage generator 20 in each phase is more accurate, which further improves the display effect of the display panel 10 and increases the service life of the display panel 10.

In other embodiments, the operation S20 may also include operations S201-S203.

In an operation S201, the method may include turning on the sample panel to enable the sample panel to be in the bright screen state.

In an operation S202, the method may include debugging the gamma voltage γ with the preset period to enable the sample panel to reach the target luminance, and acquiring multiple groups of gamma voltages γ.

In an operation S203, the method may include dividing an operating period of the sample panel into N time periods based on acquired multiple groups of gamma voltages γ, and obtaining N groups of gamma voltages γ corresponding to the N time periods and N groups of digital signals corresponding to the N groups of gamma voltages γ.

The operation S30 may include writing the N groups of gamma voltages γ to N corresponding data memories.

The operation S40 may include operations S401-S403.

In an operation S401, the method may include the control module 21 receiving the timing result outputted by the timer module 25.

In an operation S402, the method may include the control module 21 determining the current operating phase of the display panel 10 based on the timing result.

In an operation S403, the method may include in response to the display panel being in the $i^{th}$ operating phase, the control module 21 controlling an $i^{th}$ data memory to output an $i^{th}$ digital signal to enable the output module 24 to output an $i^{th}$ gamma voltage γ. i is a positive integer less than or equal to N.

In this embodiment, the operating period of the sample panel is divided into N time periods in accordance with the chronological order. The operating phases of the display panel 10 also include N operating phases corresponding to the N time periods. The control module in the gamma voltage generator 20 determines the current operating phase of the display panel based on the timing result. For example, the display panel 10 is currently in the $i^{th}$ operating phase, and the gamma voltage generator 20 controls the $i^{th}$ data memory to output the $i^{th}$ digital signal to enable the output module 24 to output the $i^{th}$ gamma voltage γ. In this way, the gamma voltage γ outputted by the gamma voltage generator 20 to the display panel 10 may always be the optimal driving voltage required in the current operating phase of the display panel 10, such that the display panel 10 may be avoided to occur the phenomenon of the display effect getting worse, such as the uneven display, the reduced luminance, the reduced color gamut, etc., due to the display panel 10 gradual aging. In addition, the division for the operating phases of the display panel 10 is more refined, and the gamma voltage γ outputted by the gamma voltage generator 20 in each phase is more accurate, which further improves the display effect of the display panel 10 and increases the service life of the display panel 10.

The above is only an implementation of the present disclosure, and is not intended to limit the scope of the present disclosure. Any equivalent structure or equivalent process transformation based on the contents of the specification and the accompanying drawings, or any direct or indirect application in other related technical fields, is included in the scope of the present disclosure in the same way.

What is claimed is:

1. A driving method of a display panel, based on a gamma voltage generator, comprising:

providing a sample panel;

performing an aging experiment test for the sample panel to acquire a first gamma voltage corresponding to a first time period and a second gamma voltage corresponding to a second time period of the sample panel after being turned on;

writing the first gamma voltage and the second gamma voltage to the gamma voltage generator; and in response to a turning-on operation of the display panel, the gamma voltage generator determining a current operating phase of the display panel and outputting the first gamma voltage or the second gamma voltage corresponding to the current operating phase to the display panel to drive the display panel to display an image;

wherein the performing an aging experiment test for the sample panel to acquire the first gamma voltage corresponding to a first time period and the second gamma voltage corresponding to a second time period of the sample panel after being turned on comprises:

turning on the sample panel to enable the sample panel to be in a bright screen state;

debugging the gamma voltage in the first time period after the sample panel is turned on to acquire the first gamma voltage and a first digital signal corresponding to the first gamma voltage while the sample panel reaches a target luminance; and debugging the gamma voltage in the second time period after the sample panel is turned on to acquire the second gamma voltage and a second digital signal corresponding to the second gamma voltage when the sample panel reaches the target luminance.

2. The driving method of the display panel according to claim 1, wherein the writing the first gamma voltage and the second gamma voltage to the gamma voltage generator, comprises:

writing the first digital signal to a first data memory of the gamma voltage generator; and writing the second digital signal to a second data memory of the gamma voltage generator.

3. The driving method of the display panel according to claim 2, wherein the performing an aging experiment test for the sample panel further comprises:

debugging the gamma voltage in a third time period after the sample panel is turned on to enable the sample panel to reach the target luminance, to acquire a third gamma voltage and a third digital signal corresponding to the third gamma voltage;

wherein the driving method further comprises:

writing the third digital signal to a third data memory of the gamma voltage generator; and in response to the turning-on operation of the display panel, the gamma voltage generator determining the current operating phase of the display panel and outputting the first gamma voltage or the second gamma voltage or the third gamma voltage corresponding to the current operating phase to the display panel to drive the display panel to display the image.

4. The driving method of the display panel according to claim 3, wherein the in response to the turning-on operation of the display panel, the gamma voltage generator determining the current operating phase of the display panel and outputting the first gamma voltage or the second gamma voltage or the third gamma voltage corresponding to the current operating phase to the display panel to drive the display panel to display the image, comprises:

a control circuit of the gamma voltage generator receiving the timing result outputted by a timer circuit of the gamma voltage generator;

the control circuit determining the current operating phase of the display panel based on the timing result, wherein the operating phases comprise a first operating phase, a second operating phase, and a third operating phase, the first operating phase, the second operating phase, and the third operating phase corresponds to the first time period, the second time period, and the third time period, respectively;

in response to the display panel being in the first operating phase, the control circuit controlling the first data memory to output the first digital signal to enable the output circuit to output the first gamma voltage;

in response to the display panel being in the second operating phase, the control circuit controlling the second data memory to output the second digital signal to enable the output circuit to output the second gamma voltage; and in response to the display panel being in the third operating phase, the control circuit controlling the third data memory to output the third digital signal to enable the output circuit to output the third gamma voltage.

5. The driving method of the display panel according to claim 4, further comprising:

the timer circuit performing a timing operation in response to the display panel being in the bright screen state;

the timer circuit stopping the timing operation in response to the display panel being in a non-bright screen state; and outputting the timing result to the control circuit with a predetermined period.

6. The driving method of the display panel according to claim 3, wherein an operating time period of the sample panel is divided into the first time period, the second time period, and the third time period in sequence in accordance with the chronological order.

7. The diving method of the display panel according to claim 6, wherein the operating time period of the sample panel is divided by time nodes, the time nodes are determined based on a debugging parameter of the gamma voltage under a case in which both a display luminance and a color gamut of the sample panel are kept unchanged, and the debugging parameter comprises debugging times or a value of a debugged gamma voltage each time.

8. The diving method of the display panel according to claim 1, wherein the sample panel has the same structure and functions with the display panel.

9. The diving method of the display panel according to claim 1, wherein the gamma voltage is debugged with a preset period to enable the sample panel to reach the target luminance.

10. A display device, comprising:

a display panel, configured to display an image; and a gamma voltage generator, electrically connected to the display panel, and configured to supply a gamma voltage to the display panel to drive the display panel to display the image;

wherein a method of the gamma voltage generator driving the display panel comprises:

providing a sample panel;

performing an aging experiment test for the sample panel to acquire a first gamma voltage corresponding to a first time period and a second gamma voltage corresponding to a second time period of the sample panel after being turned on;

writing the first gamma voltage and the second gamma voltage to the gamma voltage generator; and in response to a turning-on operation of the display panel, the gamma voltage generator determining a current operating phase of the display panel and outputting the first gamma voltage or the second gamma voltage corresponding to the current operating phase to the display panel to drive the display panel to display an image;

wherein the performing an aging experiment test for the sample panel to acquire the first gamma voltage corresponding to a first time period and the second gamma voltage corresponding to a second time period of the sample panel after being turned on comprises:

turning on the sample panel to enable the sample panel to be in a bright screen state;

debugging the gamma voltage in the first time period after the sample panel is turned on to acquire the first gamma voltage and a first digital signal corresponding to the first gamma voltage while the sample panel reaches a target luminance; and debugging the gamma voltage in the second time period after the sample panel is turned on to acquire the second gamma voltage and a second digital signal corresponding to the second gamma voltage when the sample panel reaches the target luminance.

11. The display device according to claim 10, wherein the writing the first gamma voltage and the second gamma voltage to the gamma voltage generator, comprises:

writing the first digital signal to a first data memory of the gamma voltage generator; and writing the second digital signal to a second data memory of the gamma voltage generator.

12. The display device according to claim 11, wherein the performing an aging experiment test for the sample panel further comprises:

debugging the gamma voltage in a third time period after the sample panel is turned on to enable the sample panel to reach the target luminance, to acquire a third gamma voltage and a third digital signal corresponding to the third gamma voltage;

wherein the method further comprises:

writing the third digital signal to a third data memory of the gamma voltage generator; and in response to the turning-on operation of the display panel, the gamma voltage generator determining the current operating phase of the display panel and outputting the first gamma voltage or the second gamma voltage or the third gamma voltage corresponding to the current operating phase to the display panel to drive the display panel to display the image.

13. The display device according to claim 12, wherein the in response to the turning-on operation of the display panel, the gamma voltage generator determining the current operating phase of the display panel and outputting the first gamma voltage or the second gamma voltage or the third gamma voltage corresponding to the current operating phase to the display panel to drive the display panel to display the image, comprises:

a control circuit of the gamma voltage generator receiving the timing result outputted by a timer circuit of the gamma voltage generator;

the control circuit determining the current operating phase of the display panel based on the timing result, wherein the operating phases comprise a first operating phase, a second operating phase, and a third operating phase, the first operating phase, the second operating phase, and the third operating phase corresponds to the first time period, the second time period, and the third time period, respectively;

in response to the display panel being in the first operating phase, the control circuit controlling the first data memory to output the first digital signal to enable the output circuit to output the first gamma voltage;

in response to the display panel being in the second operating phase, the control circuit controlling the second data memory to output the second digital signal to enable the output circuit to output the second gamma voltage; and in response to the display panel being in the third operating phase, the control circuit controlling the third data memory to output the third digital signal to enable the output circuit to output the third gamma voltage.

14. The driving method of the display panel according to claim 13, further comprising:

the timer circuit performing a timing operation in response to the display panel being in the bright screen state;

the timer circuit stopping the timing operation in response to the display panel being in a non-bright screen state; and outputting the timing result to the control circuit with a predetermined period.

15. The driving method of the display panel according to claim 12, wherein an operating time period of the sample panel is divided into the first time period, the second time period, and the third time period in sequence in accordance with the chronological order.

16. The diving method of the display panel according to claim 15, wherein the operating time period of the sample panel is divided by time nodes, the time nodes are determined based on a debugging parameter of the gamma voltage under a case in which both a display luminance and a color gamut of the sample panel are kept unchanged, and the debugging parameter comprises debugging times or a value of a debugged gamma voltage each time.

17. The diving method of the display panel according to claim 10, wherein the sample panel has the same structure and functions with the display panel.

18. The diving method of the display panel according to claim 10, wherein the gamma voltage is debugged with a preset period to enable the sample panel to reach the target luminance.

* * * * *